US012494610B2

(12) United States Patent
Daoust et al.

(10) Patent No.: US 12,494,610 B2
(45) Date of Patent: Dec. 9, 2025

(54) CONNECTOR FOR PROVIDING MORE RELIABLE SIGNAL PROPAGATION BY MAINTAINING CONDUCTOR PIN CONTACT AT CERTAIN PERIMETER PORTIONS THEREOF

(71) Applicant: PPC BROADBAND, INC., East Syracuse, NY (US)

(72) Inventors: Daniel Daoust, Syracuse, NY (US); Jay Kisselstein, Mexico, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 311 days.

(21) Appl. No.: 18/091,683

(22) Filed: Dec. 30, 2022

(65) Prior Publication Data

US 2023/0216257 A1 Jul. 6, 2023

Related U.S. Application Data

(60) Provisional application No. 63/295,256, filed on Dec. 30, 2021.

(51) Int. Cl.
*H01R 24/54* (2011.01)
*H01R 13/627* (2006.01)

(52) U.S. Cl.
CPC ....... *H01R 24/542* (2013.01); *H01R 13/6277* (2013.01)

(58) Field of Classification Search
None
See application file for complete search history.

(56) References Cited

U.S. PATENT DOCUMENTS 7,195,520 B1 3/2007 Huang
9,979,132 B1 5/2018 Flaherty, IV
(Continued)

FOREIGN PATENT DOCUMENTS

CN 212751328 U 3/2021

OTHER PUBLICATIONS

International Search Report and Written Opinion mailed May 4, 2023 in corresponding International Application No. PCT/US2022/054341, 17 pages.

*Primary Examiner* — Ross N Gushi
(74) *Attorney, Agent, or Firm* — MH2 TECHNOLOGY LAW GROUP LLP

(57) ABSTRACT

A connector assembly that may include a connector portion and an adapter portion that are configured to be coupled to each other. The connector and adapter portions may include first and second conductor portions that are configured to be electrically connected to each other. The first and second conductor portions each may include perimeter end portions that are configured to contact each other when the connector portion and the adapter portion are coupled to each other. One of either the first conductor portion or the second conductor portions may include a perimeter end portion and a radially inward extending end portion that may be configured to extend radially inward from the perimeter end portion of the one conductor and may be axially spaced apart in an axial direction from an inward extremity end portion of the other conductor when the connector portion and the adapter portion are coupled to each other. The perimeter end portions of the first and second conductor portions may be configured to maintain electrical contact between the first and second conductor portions so as to improve signal propagation reliability or continuity between the connector and the adapter during operation of the connector assembly.

33 Claims, 7 Drawing Sheets

(56) References Cited

U.S. PATENT DOCUMENTS

| | | | | |
|---|---|---|---|---|
| 2016/0287770 | A1 | 10/2016 | Weigand | |
| 2018/0123288 | A1 | 5/2018 | Shao et al. | |
| 2020/0106215 | A1* | 4/2020 | Montena | H01R 13/5812 |

* cited by examiner

CONNECTOR FOR PROVIDING MORE RELIABLE SIGNAL PROPAGATION BY MAINTAINING CONDUCTOR PIN CONTACT AT CERTAIN PERIMETER PORTIONS THEREOF

CROSS-REFERENCE TO RELATED APPLICATION

This application claims the benefit of U.S. Provisional Application No. 63/295,256, which was filed on Dec. 30, 2021, the disclosure of which is hereby incorporated by reference herein in its entirety.

BACKGROUND

The present invention relates generally to connectors for terminating coaxial cable. More particularly, the present invention relates to connectors that provide a secure and simple connection and improve the transmission of a center conductor signal.

Coaxial cables are commonly used in the cable television industry to carry cable TV signals to television sets in homes, businesses, and other locations.

Exemplary flexible coaxial cables include a solid wire core or inner conductor, typically of copper or copper-clad aluminum, surrounded by a flexible tubular outer conductor. The outer conductor is also usually made of woven copper or aluminum. Dielectric material or insulation separates the inner and outer conductors. The outer conductor is covered with a cable jacket or sheath of plastic to provide protection against corrosion and weathering.

The ability of a connector to make a reliable central conductor connection to the central conductor of a device has always been required to achieve long term performance as well as facilitate proper signal transmission through the connector with minimal loss or disruption of the signal. Thus, it may be desirable to provide a connector that provides a reliable contact between central conductors in coaxial connections to devices such as cable TV boxes, modems, and the like so as to facilitate proper signal transmission through the connector with minimal loss or disruption of the signal.

SUMMARY

In accordance with various embodiments of the disclosure, a clip is configured to provide a tool-less push/pull connection that is configured to allow the connector and the adapter to be connected to each other without having to use a tool to connect the connector and the adapter to each other; and a connector pin perimeter portion and an adapter pin perimeter portion are configured to biasingly maintain contact with each other during operation of the connector assembly so as to provide improved signal propagation reliability or continuity between the connector and the adapter during operation of the connector assembly.

With conductor pins that are designed to contact each other at all portions of the ends of the conductor pins, a tilting of the alignment of the connector and adapter can cause portions of the perimeters of the conductor pins to lose contact with each other, resulting in a loss or disruption of the signal. Embodiments address this problem by promoting contact at just the perimeter of the ends of the conductor pins, thereby eliminating or reducing the effects of tilting on the contact between the conductor pins.

Embodiments of the disclosure include a connector assembly configured to provide improved signal propagation reliability or continuity by maintaining conductor pin contact at least at certain perimeter portions thereof during operation including: a connector having a rearward end configured to receive a prepared end of a cable and a forward end opposite the rearward end; an adapter configured to be coupled to the forward end of the connector; and a clip that includes linear clip portions and is configured to couple the adapter to the connector. The clip is configured to provide a tool-less push/pull connection that is configured to allow the connector and the adapter to be connected to each other without having to use a tool to connect the connector and the adapter to each other; and a connector pin perimeter portion and an adapter pin perimeter portion are configured to biasingly maintain contact with each other during operation of the connector assembly so as to provide improved signal propagation reliability or continuity between the connector and the adapter during operation of the connector assembly.

In embodiments, the adapter includes a cylindrical adapter wall having an outer surface that includes an annular outer adapter surface groove portion that is configured to receive the clip.

In embodiments, the annular outer adapter surface groove portion includes radially extending adapter groove portions that are each configured to radially extend through the cylindrical adapter wall so as to permit the linear clip portions that are aligned with the radially extending adapter groove portions to extend through the cylindrical adapter wall.

In embodiments, the connector includes an outer connector surface having an annular outer connector surface groove portion that is configured to receive the linear clip portions that extend through the cylindrical wall.

In embodiments, the clip comprises a split ring having the linear clip portions separated from one another by curved clip portions.

In embodiments, the linear clip portions are configured to extend through the cylindrical adapter wall when the linear clip portions are aligned with the radially extending adapter groove portions that extends radially through the cylindrical adapter wall.

In embodiments, the connector is configured to be coupled to the adapter by pushing the connector axially into the adapter such that the annular outer adapter surface groove portion is radially aligned with the annular outer connector surface groove portion so as to allow the linear clip portions that extend through the cylindrical adapter wall to be received in the annular outer connector surface groove portion.

In embodiments, the connector is configured to be decoupled from the adapter by pulling the connector axially away from the adapter so as to urge the linear clip portions that extend through the cylindrical adapter wall radially outward from the annular outer connector surface groove portion.

In embodiments, the connector includes a connector pin that is configured to be electrically connected to a center conductor of the cable.

In embodiments, the adapter includes an adapter pin that is configured to contact the connector pin and be electrically connected to the connector pin during operation of the connector.

In embodiments, the connector pin includes a connector pin end portion that has a first conical shape.

In embodiments, the adapter pin includes an adapter pin end portion that has second conical shape.

In embodiments, the connector pin end portion and the adapter pin end portion are configured to extend into one or the other during assembly of the connector and the adapter.

In embodiments, the connector pin end portion comprises a connector pin perimeter portion that is configured to contact an adapter pin perimeter portion of the adapter pin end portion when the connector is coupled to the adapter.

In embodiments, the first conical shape of the connector pin end portion comprises a convex shaped perimeter portion, the second conical shape of the adapter pin end portion comprises a concave shaped perimeter portion, and the convex shaped perimeter portion is configured to extent radially inward from the concave shape perimeter portion that is spaced apart in an axial direction from an inward extremity of the concave shaped perimeter portion when the connector is coupled to the adapter.

In embodiments, the cable is a coaxial cable.

In embodiments, the annular outer connector surface groove portion does not extend through the connector.

Embodiments of the disclosure include: a connector assembly configured to provided improved signal propagation reliability or continuity during operation of the connector assembly including: a first portion having a rearward end configured to receive a prepared end of a cable and a forward end opposite the rearward end; a second portion configured to be coupled to the forward end of the first portion; and a retaining portion configured to couple the second portion to the first portion. The retaining portion is configured to provide a tool-less push/pull connection between the first portion and the second portion that is configured to allow the first portion and the second portion to be connected to each other without a tool; and first and second conductor perimeter portions are configured to maintain contact between a first conductor and a second conductor so as to provide improved signal propagation reliability or continuity between the first portion and the second portion during operation of the connector assembly.

In embodiments, the first portion includes a first conductor that is configured to be electrically connected to a center conductor of the cable.

In embodiments, the second portion includes a second conductor that is configured to contact the first conductor and be electrically connected to the first conductor when the first and second portions are coupled to each other.

In embodiments, the first conductor includes a first conically shaped conductor end portion.

In embodiments, the second conductor includes a second conically shaped conductor end portion.

In embodiments, the first conically shaped conductor end portion of the first conductor is configured to extend into the second conically shaped conductor end portion of the second conically shaped conductor end portion.

In embodiments, the first conductor includes a first conductor perimeter end portion that is configured to contact a second conductor perimeter end portion of the second conductor when the first portion is coupled to the second portion.

In embodiments, a non-contact portion of the first connector end portion is spaced apart in an axial direction from the second conductor end portion when the first portion is coupled to the second portion.

In embodiments, the first conically shaped conductor end portion comprises a first concave shaped conductor end portion.

In embodiments, the first conically shaped conductor end portion comprises a first convex shaped conductor end portion In embodiments, the second conically shaped conductor end portion comprises a second concave shaped conductor end portion.

In embodiments, the second conically shaped conductor end portion comprises a second convex shaped conductor end portion In embodiments, the first portion comprises a connector.

In embodiments, the second portion comprises an adapter.

In embodiments, the first conductor is a pin; and the second conductor is a pin.

In embodiments, the second portion includes a cylindrical wall having an outer surface including an annular groove configured to receive the retaining portion.

In embodiments, portions of the annular groove of the second portion are configured to extend radially completely through the cylindrical wall of the second portion to permit portions of the retaining portion aligned with the portions of the annular groove to extend through the cylindrical wall.

In embodiments, the first portion includes an outer surface having an annular groove configured to receive the portions of the retaining portion that extend through the cylindrical wall.

In embodiments, the first portion is configured to disengage from the second portion by pulling the first portion axially away from the second portion to urge the portions of the retaining portion that extend through the cylindrical wall radially outward from the annular groove of the first portion.

In embodiments, the retaining portion is configured as a split ring having linear portions separated from one another by curved portions.

In embodiments, the linear portions are configured to extend through the cylindrical wall of the second portion when the linear portions are aligned with the portions of the annular groove of the second portion that extend radially completely through the cylindrical wall of the second portion.

In embodiments, the first portion is configured to be coupled to the second portion by pushing the first portion axially into the second portion such that the annular groove of the second portion is radially aligned with the annular groove of the first portion so as to permit the portions of the retaining portion that extend through the cylindrical wall to be received in the annular groove of the first portion.

Embodiments of the disclosure include a connector assembly including: a first conductor portion having a first conductor perimeter end portion and a radially inward first conductor end portion that is located radially inward from the first conductor perimeter end portion; and a second conductor portion having a second conductor perimeter end portion and an inward second conductor end portion. The radially inward first conductor end portion is axially spaced apart in an axial direction from the inward second conductor end portion during operation of the connection assembly; and the first conductor portion and the second conductor portion are configured to maintain an electrical contact signal propagation path between the first conductor perimeter end portion and the second conductor perimeter end portion during operation of connector assembly so as to provide improved signal propagation reliability or continuity between the first conductor perimeter end portion and the second conductor perimeter end portion during operation of connector assembly.

In embodiments, the first conductor portion is formed by a connector, the second conductor portion is formed by an adapter, and the connector and the adapter are configured to be coupled to each other during operation of the connector assembly so as to maintain the electrical contact signal propagation path between the first conductor perimeter end portion and the second conductor perimeter end portion during operation of connector assembly and provide the improved signal propagation reliability or continuity between the first conductor perimeter end portion and the second conductor perimeter end portion during operation of connector assembly.

In embodiments, the first conductor portion includes a first conductor end portion, the second conductor portion comprises a second conductor end portion, and the first conductor end portion is configured to extend into the second conductor end portion during operation of the connector assembly.

In embodiments, the first conductor portion is formed by a connector, the second conductor portion is formed by an adapter, and further comprising a retaining portion that is configured to couple the connector and the adapter to each other during operation of the connector assembly.

In embodiments, the retaining portion is configured to provide a tool-less push/pull connection between the connector and the adapter that is configured to allow the connector and the adapter to be connected to each other without a tool.

In embodiments, the connector is configured to be coupled to the adapter by pushing the connector axially into the adapter such that an annular groove of the adapter is radially aligned with an annular groove of the connector so as to permit linear portions of the retaining portion that extend through the annular groove of the adapter to be received in the annular groove of the connector.

In embodiments, the first conductor portion is formed by a connector that is configured to receive a prepared end of a cable.

In embodiments, the first conductor portion is configured to be electrically connected to a center conductor of the cable during operation of the connector assembly.

In embodiments, the first conductor portion comprises a first conductor conically shape end portion and the second conductor portion comprises a second conductor conically shaped end portion.

In embodiments, the first conductor conically shaped end portion comprises a first conductor concave shaped end portion.

In embodiments, the second conductor conically shaped end portion comprises a second conductor convex shaped end portion.

In embodiments, the first conductor conically shaped end portion comprises a first conductor convex shaped end portion.

In embodiments, the second conductor conically shaped end portion comprises a second conductor concave shaped end portion.

In embodiments, the first conductor portion is a pin.

In embodiments, the second conductor portion is a pin.

Various aspects of the coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

In accordance with various embodiments of the disclosure, a clip provides a push/pull connection between a connector and an adapter while contact between the perimeters of the ends of a connector pin and an adapter pin maintains propagation of a signal on the perimeter of the connector pin and the adapter pin.

Figure 1:
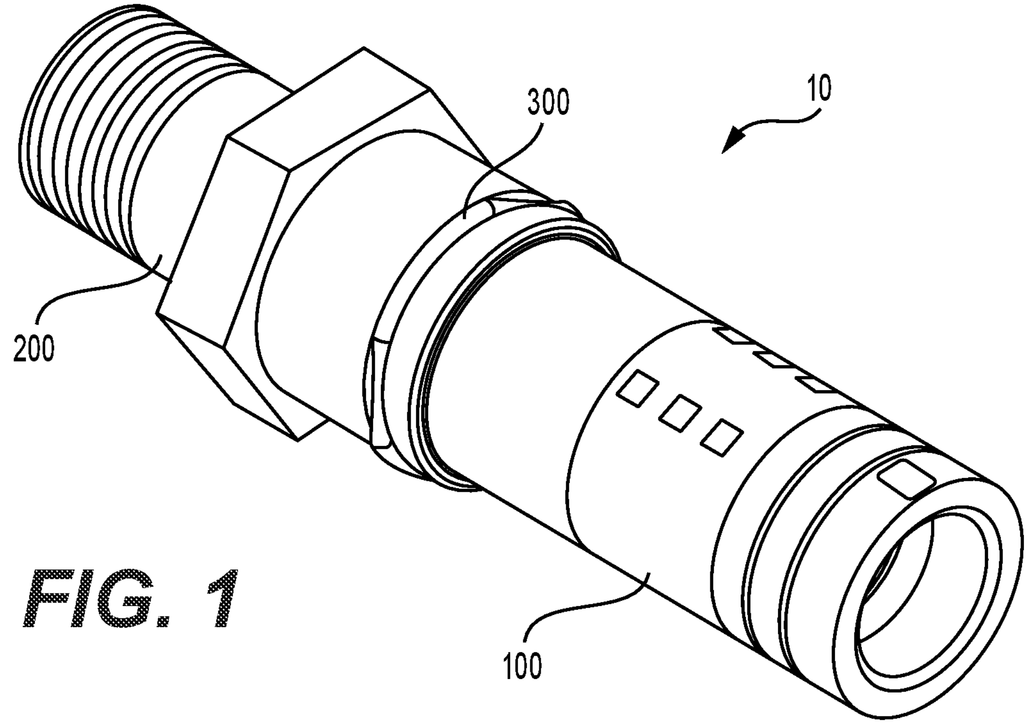
FIG. 1 is a perspective view of a coaxial connector and adapter in accordance with various aspects of the disclosure.

FIG. 1 shows a perspective view of an exemplary connector assembly 10 in accordance with various aspects of the disclosure is illustrated. The assembly 10 includes a connector 100 and an adapter 200 that are configured to be removably connected to one another while providing both an electrical and mechanical connection therebetween. In an assembled position, as shown in FIG. 1, a clip 300 holds the connector 100 and the adapter 200 together such that the electrical and mechanical connection is securely maintained.

Figure 2:
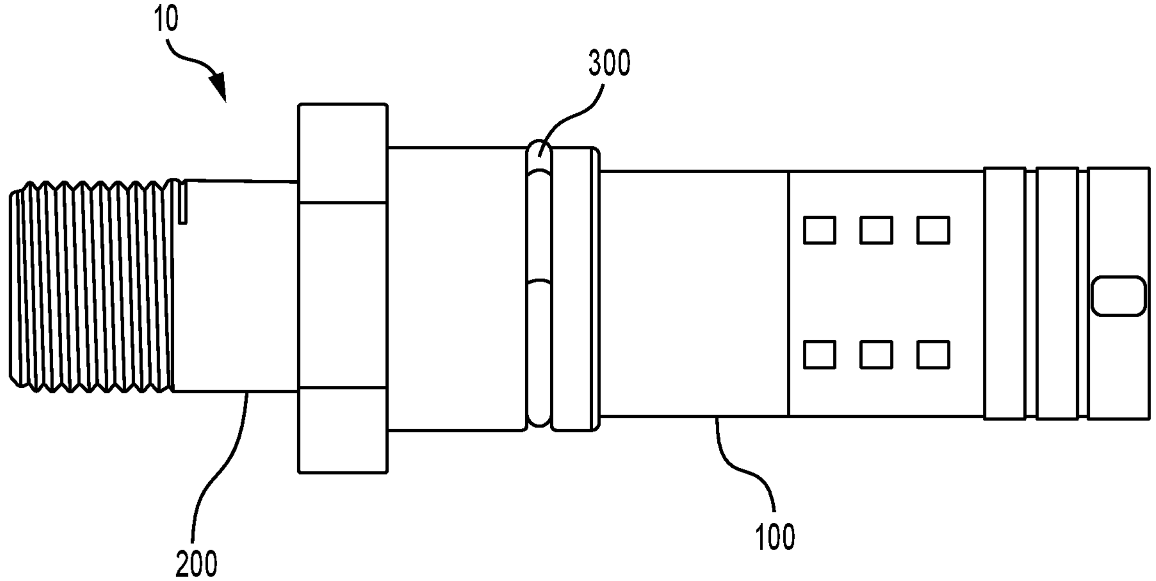
FIG. 2 is a side view of the connector and adapter of FIG. 1.
Figure 3:
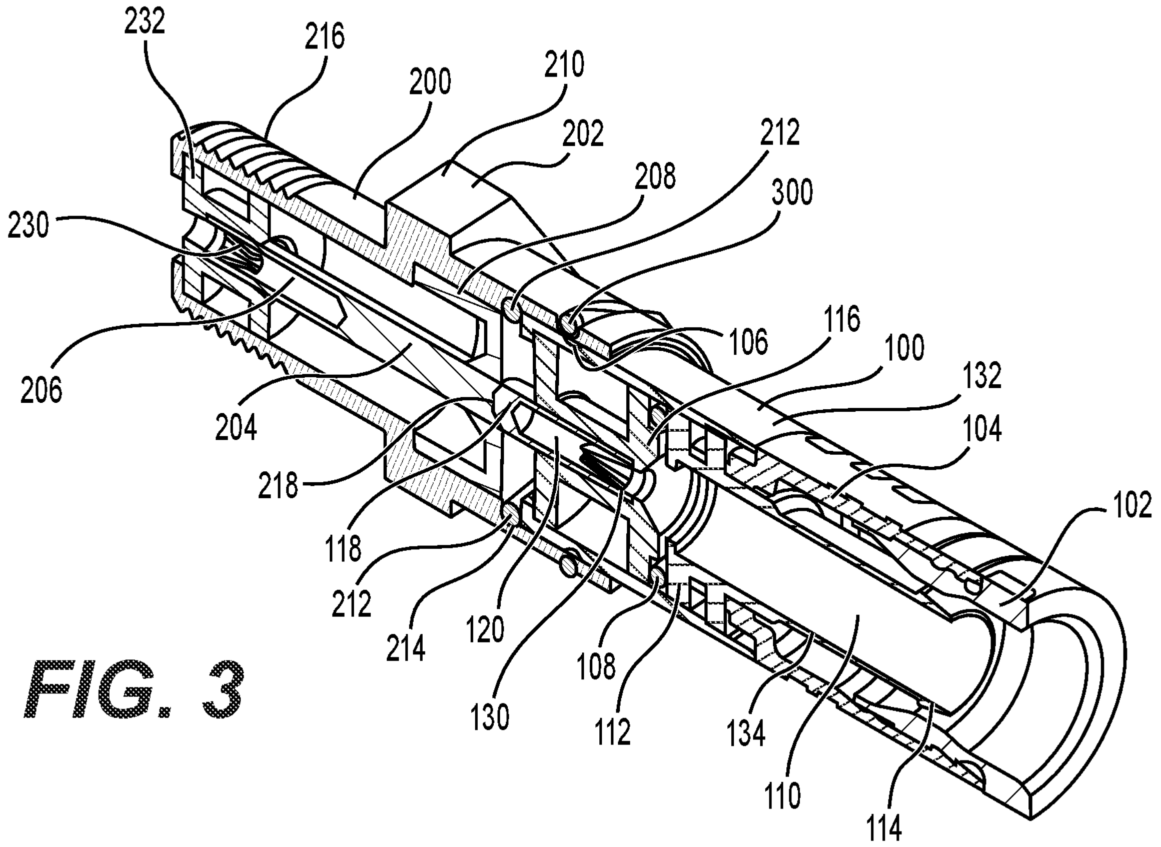
FIG. 3 is a perspective sectional view of the connector and adapter of FIG. 1.

FIG. 2 shows a side view of the assembly 10. FIG. 3 shows an example of various features of the assembly 10 in a perspective sectional view. As shown in FIG. 3, a compression ring 102 at a rearward end of the connector 100 has an opening configured to receive a coaxial cable such as coaxial cable 400 shown in FIG. 10. Coaxial cable 400 generally includes a solid center conductor 402 typically formed from a conductive metal, such as copper, copper clad aluminum, copper clad steel, or the like capable of conducting electrical signals therethrough. Surrounding the cable center conductor 402 is a cable dielectric 404, which insulates the cable center conductor 402 to minimize signal loss. The cable dielectric 404 also maintains a spacing between the cable center conductor 402 and a cable outer conductor or shield 406. The cable dielectric 404 is often a plastic material, such as a polyethylene, a fluorinated plastic material, such as a polyethylene or a polytetrafluoroethylene, a fiberglass braid, or the like. The cable shield or outer conductor 406 is typically flexible and made of metal, such as aluminum or copper braid. An insulative cable jacket 408 may surround the cable outer conductor 406 to further seal the coaxial cable 400. The cable jacket is typically made of plastic, such as polyvinylchloride, polyethylene, polyurethane, or polytetrafluoroethylene.

The connector 100 includes a plurality of components generally having a coaxial configuration about an axis defined by the center conductor 402 of the coaxial cable 400. A front portion 132 receives a post 112 in an axial bore from a rearward direction which is opposite to the adapter 200. The front portion 132 is an electrically conductive material such as aluminum, brass, or the like. The post 112 is an electrically conductive material such as aluminum, brass, or the like and has a cylindrical portion 134 that extends in the rearward direction and includes an axial bore 110. The post 112 has two flanges 136, 138 that are configured to engage the inner wall of the front portion 132. The two flanges 136, 138 provide additional surface area of electrical contact with the front portion 132. The cylindrical portion 134 extends rearward from the rearward flange 138 of the two flanges. An outer body 104 is coupled with the post 112 by an inner flange 140 that is received is a groove 142 of the cylindrical portion 134. The cylindrical portion 134 has at its most rearward end a barb 114. When the coaxial cable 400 is inserted into connector 100, the barb 114 penetrates the coaxial cable 400 between the cable dielectric 404 and the cable outer conductor or shield 406. In an assembled state, the cylindrical portion 134 forms an electrically conductive connection with the outer conductor or shield 406.

A dielectric insulator 116 is located in the front portion 132 and is configured to slide axially relative to the front portion 132. An O-ring 108 is positioned between the dielectric insulator 116 and the post 112 and may act as a spring between the dielectric insulator 116 and the post 112. In an assembled state with the coaxial cable 400 in place, the dielectric insulator 116 and the post 112 can, but do not have to, contact each other. The connector 100 includes an outer body 104 that extends partially into the front portion 132 and is limited in movement relative to the front portion 132 in the axial direction. A knurled or other engaging interface can exist between the outer body 104 and the post 112 to prevent the post 114 from rotating relative to the outer body 104.

The compression ring 102 extends axially partially into the outer body 104. The connector 100 includes a pin 118 that is received in the dielectric insulator 116. The pin 118 has a center conductor connector 130 (such as a milmax connector) configured to receive and make an electrically conductive connection with the cable center conductor 402 of the coaxial cable 400. In an assembled state, the cable center conductor 402 extends into a bore 120 of the pin 118.

Figure 10:
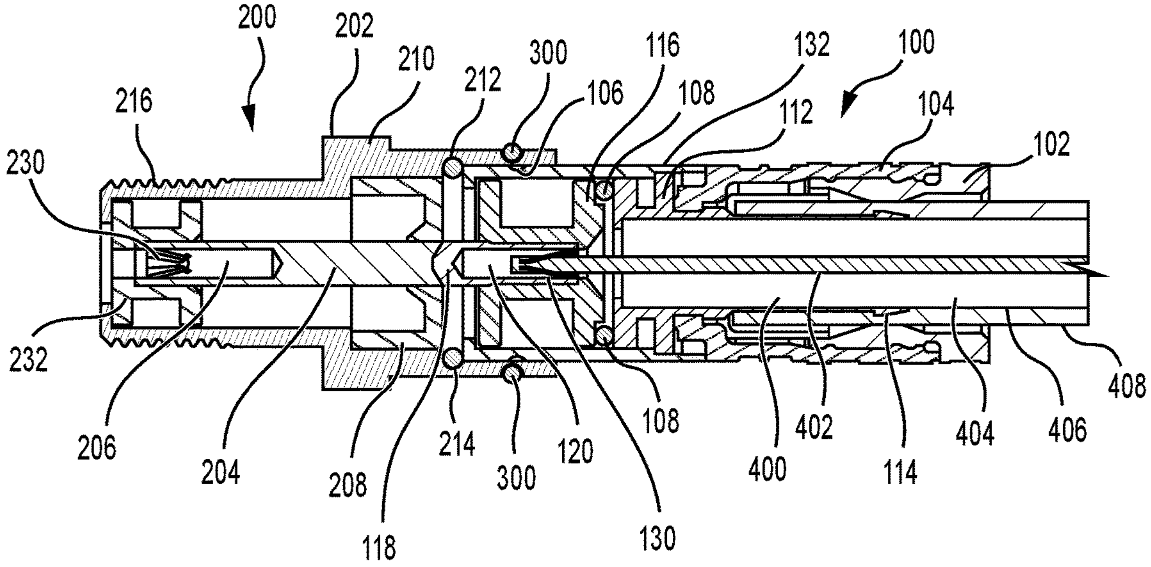
FIG. 10 is a sectional view of the connector and adapter of FIG. 1 with a coaxial cable in place in the connector.

During connection of the coaxial cable 400 to the connector 100, the coaxial cable 400 is inserted into the opening in the compression ring 102 and into contact with the post 112. The barb 114 separates the cable outer conductor or shield 406 from the cable dielectric 404. As the coaxial cable is further inserted into the connector 100, the cable center conductor 402 enters the center conductor connector 130 and the bore 120 (as shown in FIG. 10). In the assembled state shown in FIG. 10, an electrically conductive path is formed from the cable center conductor 402 through center conductor connector 130 and pin 118. In the assembled state shown in FIG. 10, an electrically conductive path is formed from the cable outer conductor or shield 406 through the post 112 and the front portion 132.

The adapter 200 is configured to be mounted in devices located in the field that receive the forward end of the connector 100. Examples of such devices are cable TV boxes, modems, and the like. The adapter 200 has a body 210 that includes a bearing surface 202 such as a hexagonal shape that is configured to receive a wrench or other tightening tool. The body 210 has threads or another attachment feature (not shown) configured to attach adapter 200 to the device. The adapter 200 has a connection portion 216 such as a threaded portion that is configured to receive a cable or other electrical connection to electrically connect the coaxial cable 400 to the device.

The adapter 200 has a first dielectric insulator 208 and a second dielectric insulator 232 positioned in recesses in the body 210. An electrically conductive pin 204 is positioned in the first dielectric insulator 208 and the second dielectric insulator 232. The pin 204 has a center conductor connector 230 (such as a milmax connector) configured to receive and make an electrically conductive connection to a conductor internal to the device. In an assembled state, the conductor of the device extends into a bore 206 of the pin 204. The pin 204 has an end 218 configured to contact the pin 118 of the connector 100, as described in more detail below.

The adapter 200 includes in interior groove 214 that receives a conductive O-ring 212 that is positioned between body 210 of adapter 200 and the front portion 132 of the connector 100. The conductive O-ring 212 provides an electrical connection between the body 210 and the front portion 132 in addition to the direct contact of the body 210 and the front portion 132.

Figure 4:
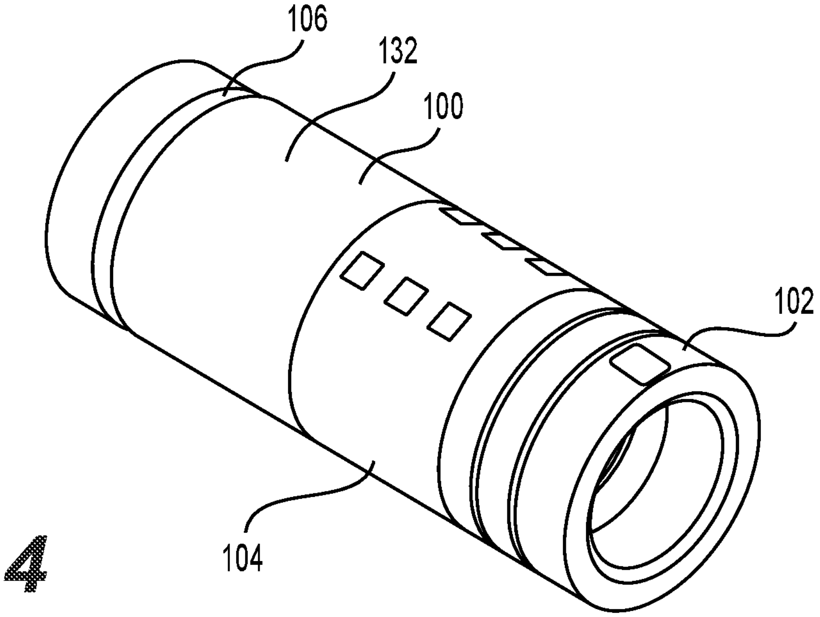
FIG. 4 is a perspective view of the connector of FIG. 1.
Figure 5:
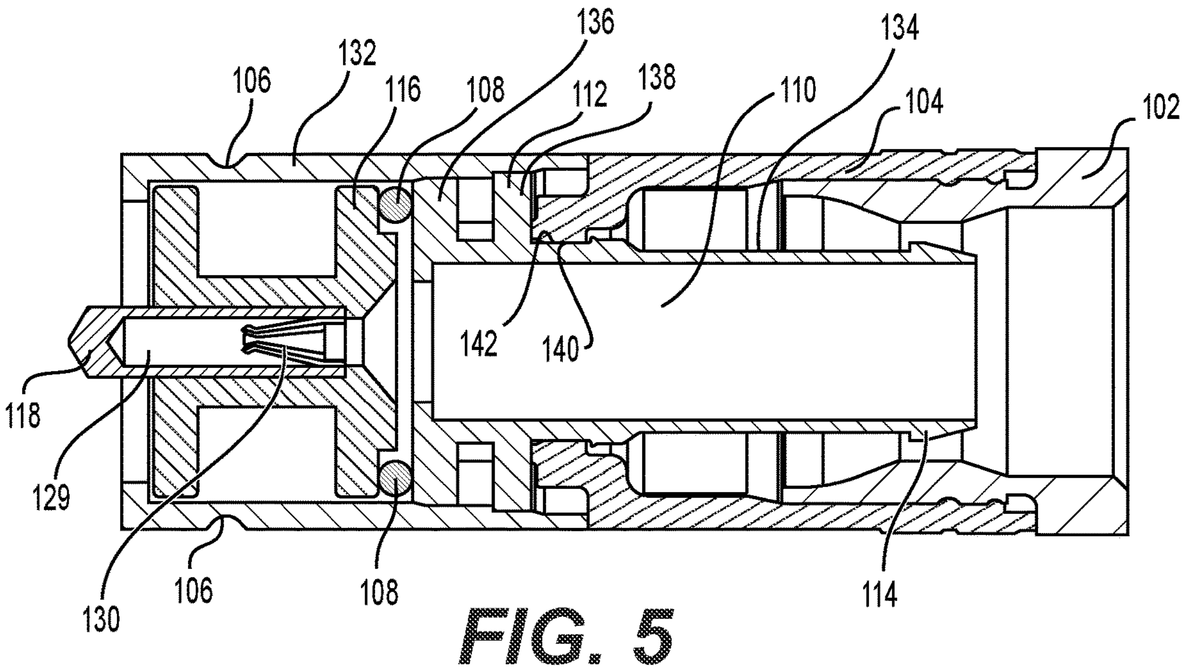
FIG. 5 is a sectional view of the connector of FIG. 1.

FIG. 4 shows a perspective view of the connector 100 disconnected from the adapter 200 and coaxial cable 400. FIG. 5 shows a sectional view of the connector 100 disconnected from the adapter 200 and coaxial cable 400.

Figure 6:
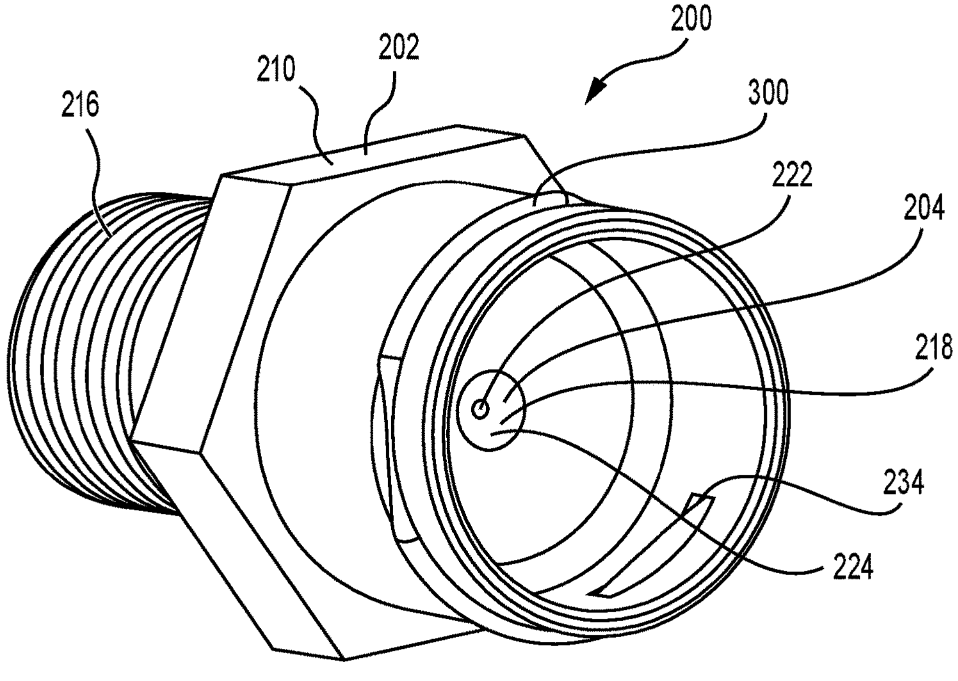
FIG. 6 is perspective view of the adapter of FIG. 1 with a clip in place in the adapter.
Figure 7:
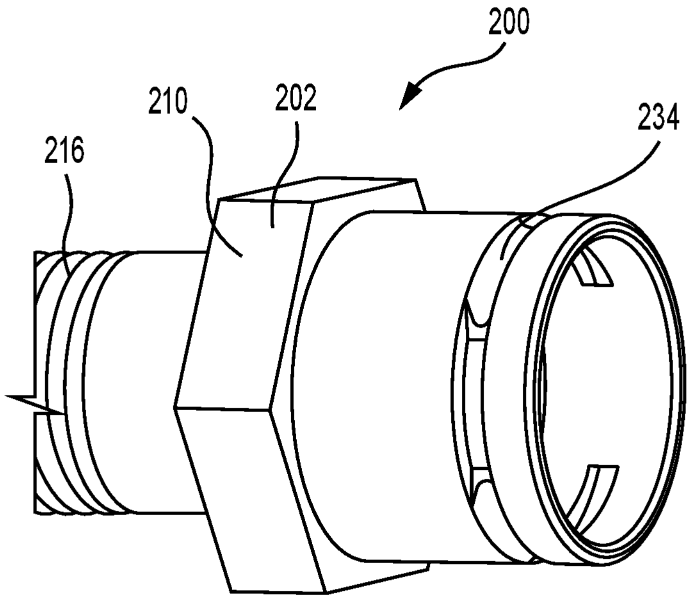
FIG. 7 is a perspective view of the adapter of FIG. 1 without the clip.

FIG. 6 shows a perspective view of the adapter 200 with the clip 300 in place in a groove 234 in the body 210. FIG. 7 shows a perspective view of the adapter 200 with the clip 300 removed from the groove 234 in the body 210. As shown in FIGS. 6 and 7, the groove 234 extends completely through the body 210 in a number of locations and does not extend completely through the body 210 in other locations. The configuration of groove 234 maintains an axial location of the clip 300 while also preventing rotation of the clip 300 relative to the body 210. The areas of the groove 234 that extend completely through body 210 allow the clip 300 to engage a groove 106 in the front portion 132 of the connector 100. The groove 106 is a continuous groove and allows connector 100 to rotate relative to adapter 200 when in an assembled state. In other embodiments, the groove 106 has protrusions or other features to prevent rotation of the front portion 132 relative to clip 300.

Figure 8:
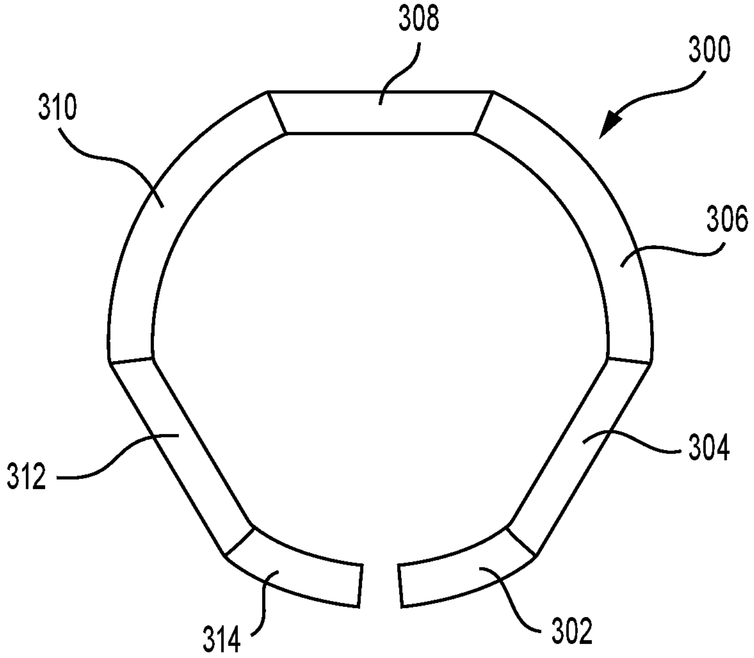
FIG. 8 is a side view of the clip of FIG. 6.

FIG. 8 shows an example of the clip 300 having three engagement portions 304, 308, 312 that are configured to extend through the body 210 of the adapter 200 and engage the groove 106 in the front portion 132 of the connector 100. The clip 300 has four non-engagement portions 302, 306, 310, 314 that are configured to contact the groove 234 in the body 210, but do not engage the groove 106 in the front portion 132. The clip 300 is a resilient material such as a metal that retains its shape and springs back to its original shape after being deformed. During assembly of the connector 100 with the adapter 200, the clip 300 is deformed outward as the front portion 132 of the connector 100 is inserted into the body 210 of the adapter 200 and passes by the groove 234 and the clip 300. As the clip 300 aligns with the groove 106 in the front portion 132, the clip 300 springs into the groove 106 and retains the connector 100 in the adapter 200. The connector 100 can be removed from the adapter 200 by a user pulling firmly on the connector 100. However, the spring force of the clip 300 in the groove 106 prevents the connector 100 from being detached from the adapter 200 inadvertently.

Figure 9:
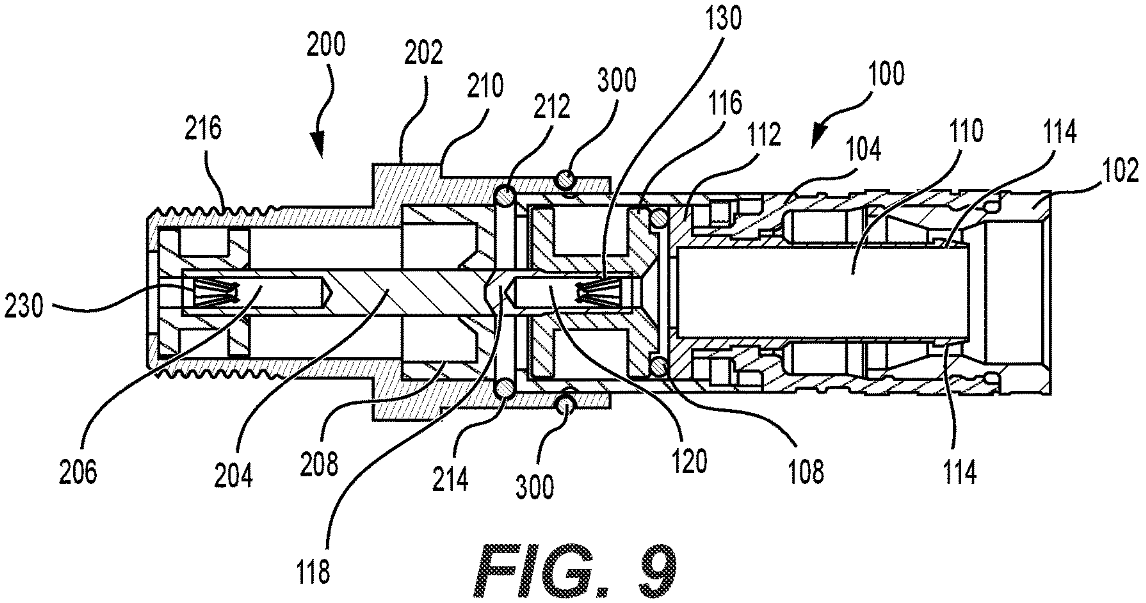
FIG. 9 is a sectional view of the connector and adapter of FIG. 1.
Figure 11:
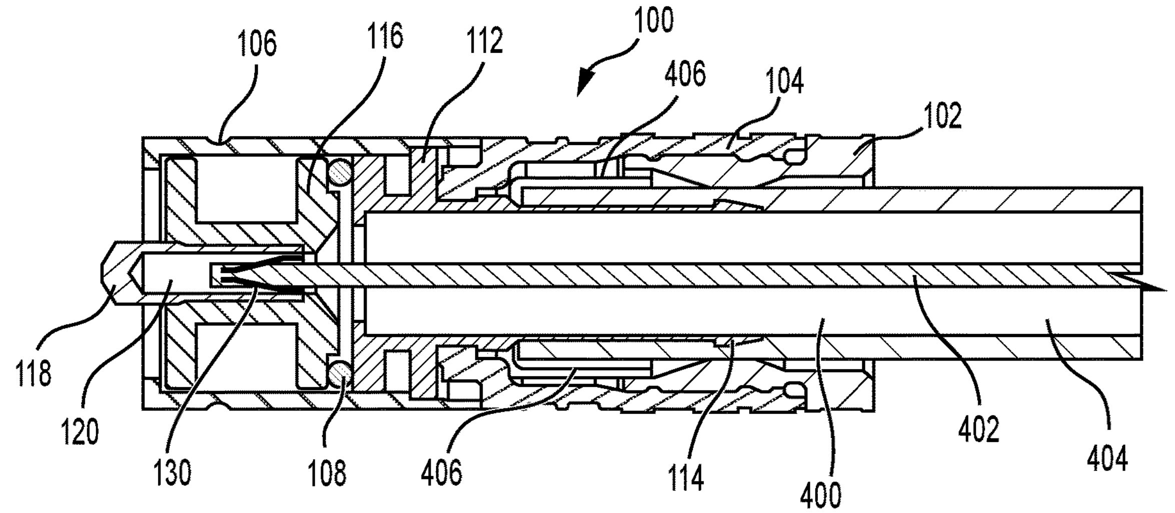
FIG. 11 is a sectional view of the connector of FIG. 1 with a coaxial cable in place in the connector.

FIG. 9 shows a sectional view of the adapter 200 and the connector 100 without the coaxial cable 400. FIG. 10 shows a sectional view of the adapter 200 and the connector 100 with the coaxial cable 400 in an installed state. In the state shown in FIG. 10, the clip 300 engages both the groove 234 in the body 210 of the adapter 200 and the groove 106 in the front portion 132 of the connector 100. FIG. 11 shows a sectional view of the connector 100 with the coaxial cable 400 in an installed state. FIG. 11 shows the cable outer conductor or shield 406 separated from the cable dielectric 404 of the coaxial cable 400 by the barb 114 of the post 112.

Figure 12:
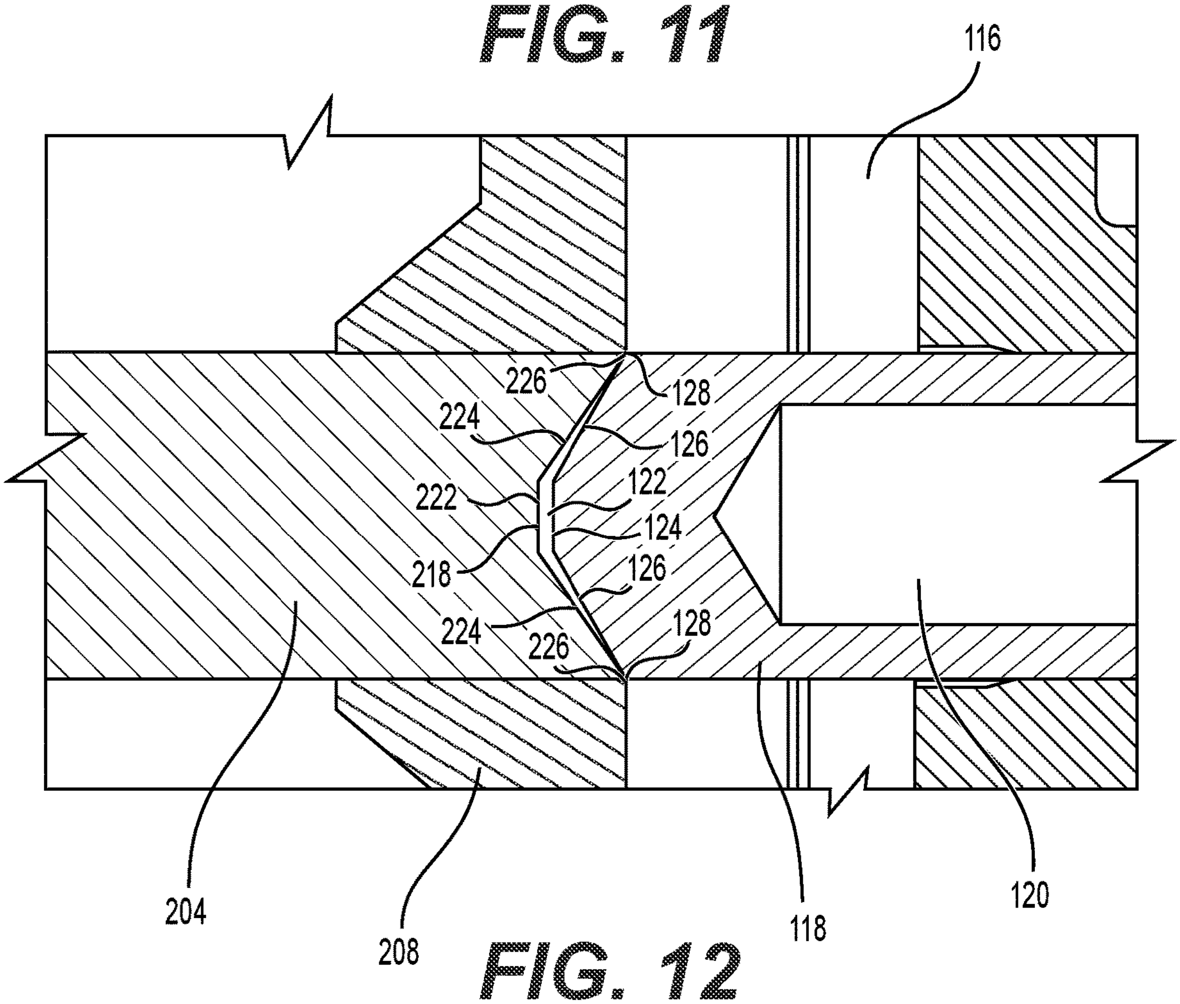
FIG. 12 is an enlarged partial sectional view of an interface between pins of the connector and adapter of FIG. 1.
Figure 13:
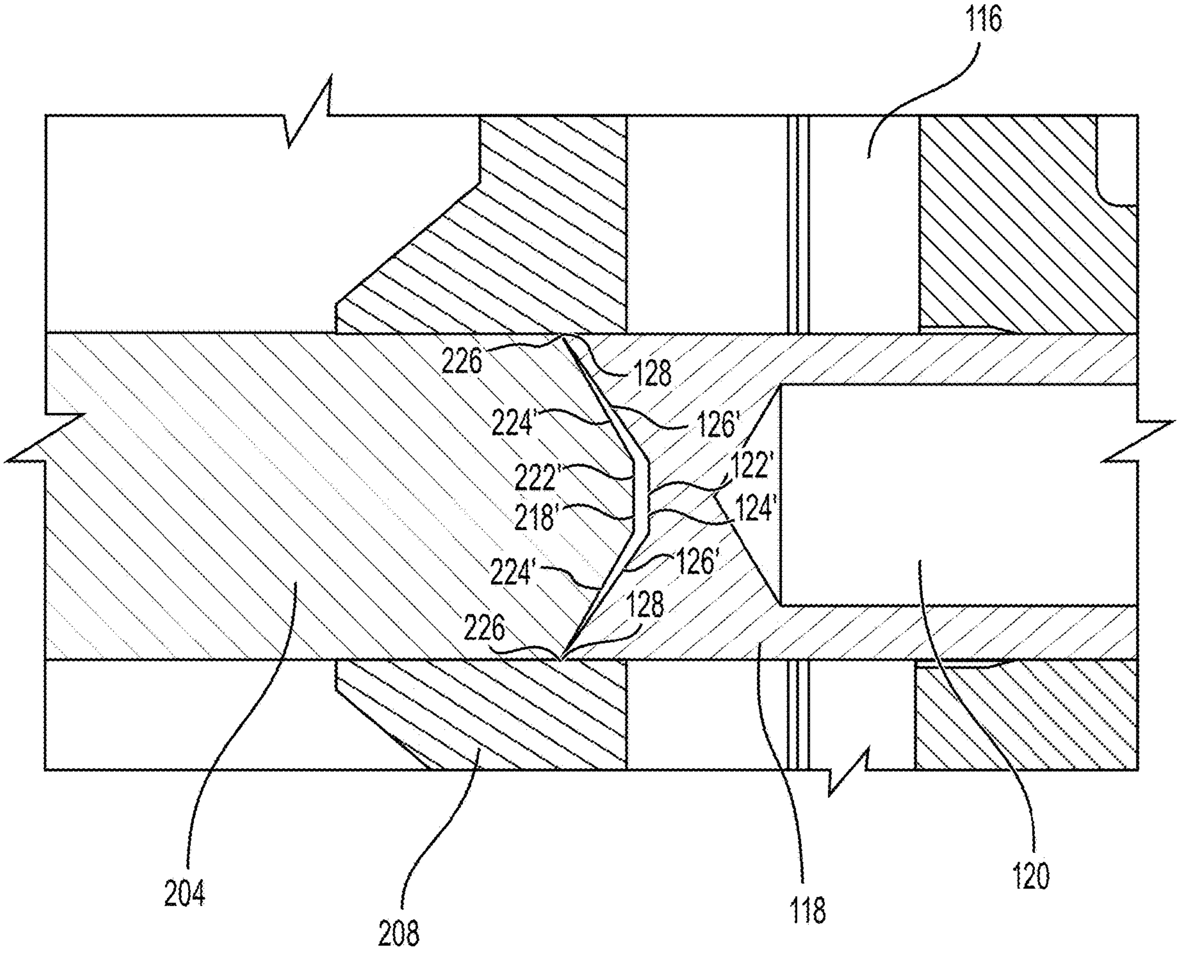
FIG. 13 is an enlarged partial sectional view of an alternate interface between pins of the connector and adapter of FIG. 1.

FIG. 12 shows an example of the contact between the pin 204 of the adapter 200 and the pin 118 of the connector 100 when the adapter 200 and the connector 100 are coupled to one another. It may be advantageous to concentrate the electrically conductive contact between the pins 204 and 118 at the outer perimeter of the pins 204 and 118. Accordingly, as shown in FIG. 12, the shapes of the ends of the pins 204 and 118 can be selected such that the contact of the pins 204, 118 is concentrated at the perimeters. For example, the pin 204 has an end 218 that is in the shape of a truncated cone (also shown in FIG. 6). The pin 204 has a flat central portion 222 and a conical portion 224. The outer extremity of the conical portion 224 forms a circular edge 226. The pin 118 has an end 122 that is in the shape of a truncated cone, complementary to the end 218 of the pin 204 such that the end 218 is configured to receive the end 122. The pin 118 has a flat central portion 124 and a conical portion 126. The outer extremity of the conical portion 126 forms a circular edge 128. As shown in FIG. 12, the angle of the conical portion 224 relative to the axis of the pins 204, 118 is different than the angle of the conical portion 126 relative to the axis of the pins 204, 118. This difference in angles makes the contact between the circular edge 226 and the circular edge 128 the only contact between the pins 204, 118. The angles shown in FIG. 12 are just an example and other angles can be used. For example, the end 122 of the pin 118 can be flat and have no conical area. In other examples, the end 122 of the pin 118 can be a cone or truncated cone having a negative angle such that the end 122 of the pin 118 does not enter the truncated conical shaped void in the pin 204. FIG. 13 shows an alternate example in which the end 218' of pin 204 and the end 122' of pin 118 are opposite of ends 218 and 122 shown in FIG. 12.

In FIG. 13, the pin 204 has an end 218' that is in the shape of a truncated cone. The pin 204 has a flat central portion 222' and a conical portion 224'. The outer extremity of the conical portion 224' forms a circular edge 226. The pin 118 has an end 122' that is in the shape of a truncated cone, complementary to the end 218' of the pin 204 such that the end 122' is configured to receive the end 218'. The pin 118 has a flat central portion 124' and a conical portion 126'. The outer extremity of the conical portion 126' forms a circular edge 128. As shown in FIG. 13, the angle of the conical portion 224' relative to the axis of the pins 204, 118 is different than the angle of the conical portion 126' relative to the axis of the pins 204, 118.

The described embodiments provide various advantages including a simple and reliable connection that can be easily performed by a non-skilled user without any tools. The term "toolless" is understood to mean that the operation can be performed without any tools. The described embodiments provide this connection with a tactile and/or audible indication that the connection has been made properly. For example, the clip 300 snapping into the groove 106 provides both a tactile and an audible indication that the proper connection has been made.

In alternate embodiments, the adapter 200 may include an internally threaded male end instead of the externally threaded female end of connection portion 216 so that the adapter 200 can be used to retrofit current communications equipment that has an externally threaded port. Such a retrofit would allow the use of the connector 100 with existing equipment.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A connector assembly configured to provide improved signal propagation reliability or continuity by maintaining conductor pin contact at least at certain perimeter portions thereof during operation comprising:

a connector having a rearward end configured to receive a prepared end of a cable and a forward end opposite the rearward end;

an adapter configured to be coupled to the forward end of the connector;

a clip that includes linear clip portions and is configured to couple the adapter to the connector;

wherein the adapter includes a cylindrical adapter wall having an outer surface that includes an annular outer adapter surface groove portion that is configured to receive the clip;

wherein the annular outer adapter surface groove portion includes radially extending adapter groove portions that are each configured to radially extend through the cylindrical adapter wall so as to permit the linear clip portions that are aligned with the radially extending adapter groove portions to extend through the cylindrical adapter wall;

wherein the connector includes an outer connector surface having an annular outer connector surface groove portion that is configured to receive the linear clip portions that extend through the cylindrical wall;

wherein the clip comprises a split ring having the linear clip portions separated from one another by curved clip portions;

wherein the linear clip portions are configured to extend through the cylindrical adapter wall when the linear clip portions are aligned with the radially extending adapter groove portions that extends radially through the cylindrical adapter wall;

wherein the connector is configured to be coupled to the adapter by pushing the connector axially into the adapter such that the annular outer adapter surface groove portion is radially aligned with the annular outer connector surface groove portion so as to allow the linear clip portions that extend through the cylindrical adapter wall to be received in the annular outer connector surface groove portion;

wherein the connector is configured to be de-coupled from the adapter by pulling the connector axially away from the adapter so as to urge the linear clip portions that extend through the cylindrical adapter wall radially outward from the annular outer connector surface groove portion;

wherein the connector includes a connector pin that is configured to be electrically connected to a center conductor of the cable;

wherein the adapter includes an adapter pin that is configured to contact the connector pin and be electrically connected to the connector pin during operation of the connector;

wherein the connector pin includes a connector pin end portion that has a first conical shape;

wherein the adapter pin includes an adapter pin end portion that has second conical shape;

wherein the connector pin end portion and the adapter pin end portion are configured to extend into one or the other during assembly of the connector and the adapter;

wherein the connector pin end portion comprises a connector pin perimeter portion that is configured to contact an adapter pin perimeter portion of the adapter pin end portion when the connector is coupled to the adapter;

wherein the first conical shape of the connector pin end portion comprises a convex shaped perimeter portion, the second conical shape of the adapter pin end portion comprises a concave shaped perimeter portion, and the convex shaped perimeter portion is configured to extent radially inward from the concave shape perimeter portion that is spaced apart in an axial direction from an inward extremity of the concave shaped perimeter portion when the connector is coupled to the adapter;

wherein the clip is configured to provide a tool-less push/pull connection that is configured to allow the connector and the adapter to be connected to each other without having to use a tool to connect the connector and the adapter to each other; and wherein the connector pin perimeter portion and the adapter pin perimeter portion are configured to biasingly maintain contact with each other during operation of the connector assembly so as to provide improved signal propagation reliability or continuity between the connector and the adapter during operation of the connector assembly.

2. The connector assembly of claim 1, wherein the cable is a coaxial cable.

3. The connector assembly of claim 1, wherein the annular outer connector surface groove portion does not extend through the connector.

4. A connector assembly configured to provided improved signal propagation reliability or continuity during operation of the connector assembly comprising:

a first portion having a rearward end configured to receive a prepared end of a cable and a forward end opposite the rearward end;

a second portion configured to be coupled to the forward end of the first portion;

a retaining portion configured to couple the second portion to the first portion;

wherein the first portion includes a first conductor that is configured to be electrically connected to a center conductor of the cable;

wherein the second portion includes a second conductor that is configured to contact the first conductor and be electrically connected to the first conductor when the first and second portions are coupled to each other;

wherein the first conductor includes a first conically shaped conductor end portion;

wherein the second conductor includes a second conically shaped conductor end portion;

wherein the first conically shaped conductor end portion of the first conductor is configured to extend into the second conically shaped conductor end portion of the second conically shaped conductor end portion;

wherein the first conductor includes a first conductor perimeter end portion located at an axial end of a radial perimeter of the first conductor that is configured to contact a second conductor perimeter end portion of the second conductor located at an axial end of a radial perimeter of the second conductor when the first portion is coupled to the second portion;

wherein a non-contact portion of the first conductor end portion is spaced apart in an axial direction from the second conductor end portion when the first portion is coupled to the second portion;

wherein the retaining portion is configured to provide a tool-less push/pull connection between the first portion and the second portion that is configured to allow the first portion and the second portion to be connected to each other without a tool; and wherein the first conductor perimeter portion and the second conductor perimeter portion are configured to maintain contact between the first conductor and the second conductor so as to provide improved signal propagation reliability or continuity between the first portion and the second portion during operation of the connector assembly.

5. The connector assembly of claim 4, wherein the first conically shaped conductor end portion comprises a first concave shaped conductor end portion.

6. The connector assembly of claim 4, wherein the first conically shaped conductor end portion comprises a first convex shaped conductor end portion.

7. The connector assembly of claim 4, wherein the second conically shaped conductor end portion comprises a second concave shaped conductor end portion.

8. The connector assembly of claim 4, wherein the second conically shaped conductor end portion comprises a second convex shaped conductor end portion.

9. The connector assembly of claim 4, wherein the first portion comprises a connector.

10. The connector assembly of claim 4, wherein the second portion comprises an adapter.

11. The connector assembly of claim 4, wherein the first conductor is a pin; and the second conductor is a pin.

12. The connector assembly of claim 4, wherein the second portion includes a cylindrical wall having an outer surface including an annular groove configured to receive the retaining portion.

13. The connector assembly of claim 12, wherein portions of the annular groove of the second portion are configured to extend radially completely through the cylindrical wall of the second portion to permit portions of the retaining portion aligned with the portions of the annular groove to extend through the cylindrical wall.

14. The connector assembly of claim 13, wherein the first portion includes an outer surface having an annular groove configured to receive the portions of the retaining portion that extend through the cylindrical wall.

15. The connector assembly of claim 14, wherein the first portion is configured to disengage from the second portion by pulling the first portion axially away from the second portion to urge the portions of the retaining portion that extend through the cylindrical wall radially outward from the annular groove of the first portion.

16. The connector assembly of claim 14, wherein the retaining portion is configured as a split ring having linear portions separated from one another by curved portions.

17. The connector assembly of claim 16, wherein the linear portions are configured to extend through the cylindrical wall of the second portion when the linear portions are aligned with the portions of the annular groove of the second portion that extend radially completely through the cylindrical wall of the second portion.

18. The connector assembly of claim 17, wherein the first portion is configured to be coupled to the second portion by pushing the first portion axially into the second portion such that the annular groove of the second portion is radially aligned with the annular groove of the first portion so as to permit the portions of the retaining portion that extend through the cylindrical wall to be received in the annular groove of the first portion.

19. A connector assembly comprising:

a first conductor portion having a first conductor perimeter end portion located at an axial end of a radial perimeter of the first conductor portion and a radially inward first conductor end portion that is located radially inward from the first conductor perimeter end portion;

a second conductor portion having a second conductor perimeter end portion located at an axial end of a radial perimeter of the second conductor portion and an inward second conductor end portion;

wherein the radially inward first conductor end portion is axially spaced apart in an axial direction from the inward second conductor end portion during operation of the connection assembly; and wherein the first conductor portion and the second conductor portion are configured to maintain an electrical contact signal propagation path between the first conductor perimeter end portion and the second conductor perimeter end portion during operation of connector assembly so as to provide improved signal propagation reliability or continuity between the first conductor perimeter end portion and the second conductor perimeter end portion during operation of connector assembly.

20. The connector assembly of claim 19, wherein the first conductor portion is formed by a connector, the second conductor portion is formed by an adapter, and the connector and the adapter are configured to be coupled to each other during operation of the connector assembly so as to maintain the electrical contact signal propagation path between the first conductor perimeter end portion and the second conductor perimeter end portion during operation of connector assembly and provide the improved signal propagation reliability or continuity between the first conductor perimeter end portion and the second conductor perimeter end portion during operation of connector assembly.

21. The connector assembly of claim 19, wherein the first conductor portion includes a first conductor end portion, the second conductor portion comprises a second conductor end portion, and the first conductor end portion is configured to extend into the second conductor end portion during operation of the connector assembly.

22. The connector assembly of claim 19, wherein the first conductor portion is formed by a connector, the second conductor portion is formed by an adapter, and further comprising a retaining portion that is configured to couple the connector and the adapter to each other during operation of the connector assembly.

23. The connector assembly of claim 22, wherein the retaining portion is configured to provide a tool-less push/pull connection between the connector and the adapter that is configured to allow the connector and the adapter to be connected to each other without a tool.

24. The connector assembly of claim 23, wherein the connector is configured to be coupled to the adapter by pushing the connector axially into the adapter such that an annular groove of the adapter is radially aligned with an annular groove of the connector so as to permit linear portions of the retaining portion that extend through the annular groove of the adapter to be received in the annular groove of the connector.

25. The connector assembly of claim 19, wherein the first conductor portion is formed by a connector that is configured to receive a prepared end of a cable.

26. The connector assembly of claim 25, wherein the first conductor portion is configured to be electrically connected to a center conductor of the cable during operation of the connector assembly.

27. The connector assembly of claim 19, wherein the first conductor portion comprises a first conductor conically shape end portion and the second conductor portion comprises a second conductor conically shaped end portion.

28. The connector assembly of claim 27, wherein the first conductor conically shaped end portion comprises a first conductor convex shaped end portion.

29. The connector assembly of claim 28, wherein the second conductor conically shaped end portion comprises a second conductor concave shaped end portion.

30. The connector assembly of claim 27, wherein the first conductor conically shaped end portion comprises a first conductor concave shaped end portion.

31. The connector assembly of claim 30, wherein the second conductor conically shaped end portion comprises a second conductor convex shaped end portion.

32. The connector assembly of claim 19, wherein the first conductor portion is a pin.

33. The connector assembly of claim 19, wherein the second conductor portion is a pin.

* * * * *